Patented Apr. 29, 1952

2,594,979

UNITED STATES PATENT OFFICE 2,594,979

RESINOUS COMPOSITIONS AND THEIR USE

John D. Nelson, Pittsfield, Mass., assignor to General Electric Company, a corporation of New York No Drawing. Application January 19, 1949,
Serial No. 71,769

5 Claims. (Cl. 260—17.2)

This invention relates to compositions of matter derived from the resinous condensation product of bis-phenol and an epihalogenohydrin. More particularly, the invention is concerned with a composition of matter comprising (1) the resinous product of reaction between an epihalogenohydrin, for instance, epichlorohydrin

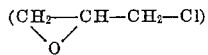

and bis - (4-hydroxyphenyl) dimethylmethane, commonly known as "Bis-phenol A," and having the formula

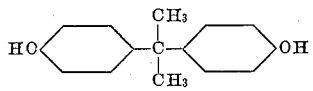

and (2) an organic compound corresponding to the general formula ZCNRNCZ where R is a divalent organic radical free of functional groups other than the two NCZ groups and Z is a member selected from the class consisting of oxygen and sulfur.

The resinous condensation products described above (one method of preparing the same being more particularly described in U. S. Patent 2,444,333 issued June 28, 1948) are known as "Epon" resins which range from solids to viscous liquids having molecular weights of the order of from approximately 1000 to 3000 and are sold by the Shell Chemical Company of New York, N. Y. In effecting the condensation reaction, the ratio of the epihalogenohydrin to the bis-phenol is maintained slightly below or around 2:1.

One of the objects of this invention is to prepare an adhesive which cures at room temperature.

Another object of this invention is to prepare adhesives capable of bonding metal to metal at normal temperatures.

A further object is to make an adhesive requiring low pressures while the adhesive is being cured.

A still further object of this invention is to prepare a room temperature curing adhesive which does not generate heat during mixing of the components thereby eliminating the requirement for cooling thereof.

Other objects of this invention will become more apparent from the description thereof which follows.

In accordance with my invention, I am able to prepare resinous compositions of matter having extremely useful properties by employing as a cure accelerator for the resinous condensation product of the bis-phenol and the epihalogenohydrin, an organic compound corresponding to the general formula ZCNRNCZ where R is a divalent organic radical free of functional groups other than the two isocyanate and isothiocyanate groups, and Z is a member selected from the class consisting of sulfur and oxygen. Thus R in the above formula may be a divalent alkylene radical, arylene radical, alkarylene radical, aralkylene radical, etc.

Among the diisocyanates and diisothiocyanates useful in the practice of this invention there may be mentioned, for example, polymethylene diisocyanates and diisothiocyanates such as, for instance, ethylene diisocyanate, trimethylene diisocyanate, trimethylene diisothiocyanate, hexamethylene diisothiocyanate, propylene 1,2-diisocyanate, butylene 1,3-diisothiocyanate, ethylidene diisocyanate [CH$_3$CH(NCO)$_2$], propylidene-2,2-diisothiocyanate [CH$_2$C(NCS)$_2$CH$_3$], etc.; cycloalkylene diisocyanates and diisothiocyanates, such as cyclopentylene-1,3-diisocyanate, cyclohexylene-1,2-diisothiocyanate, etc.: aromatic diisocyanates and diisothiocyanates, e. g., 1,4-phenylene diisocyanate, 1,4-phenylene diisothiocyanate, etc.; aliphatic aromatic diisocyanates and diisothiocyanates, such as for instance, xylylene-1,4-diisocyanate, or xylylene-1,3-diisocyanate, etc.; aromatic aliphatic diisocyanates and diisothiocyanates, such as 1-phenyl-1,3-diisocyanatopropane, etc.; hetero-atom diisocyanates, such as, for instance,

OCN(CH$_2$)$_3$O(CH$_2$)$_3$NCO etc.; other diisocyanates and diisothiocyanates, such as, for instance, methylene bis-(4-phenyl) isocyanate, methylene bis-(4-phenyl) isothiocyanate, etc. Polyisocyanates, e. g., silicon tetraisocyanate, ethylene tetraisocyanate, etc.; may also be employed.

The proportion of the resinous condensation product of the epihalogenohydrin and the bisphenol (for brevity hereinafter referred to as the "resinous condensation product") and the cyanato compound, i. e., the diisocyanate or diisothiocyanate, may be varied within wide ranges depending upon the type of cyanato compound employed, the particular application intended (either for molding, adhesive, or other purposes), the surfaces to be bonded when used as an adhesive, etc. For some purposes, especially when the claimed compositions of matter are used as adhesives, I have found it desirable that of the total weight of the cyanato compound and the resinous condensation product, the former be present, by weight, in an amount equal to from about 20 to 70 per cent, and the latter in an amount equal to from about 30 to 80 per cent, good results being obtained when the two components are present in approximately equal parts by weight. It will, of course, be apparent to those skilled in the art that other proportions of the ingredients may be employed without departing from the scope of the claimed invention.

When the claimed compositions of matter are employed as adhesives, I have found it advantageous to incorporate in the adhesive prior to application of the surface to be bonded a filler, such as, for instance, a cellulosic filler, for example, wood flour, alpha-cellulose, nut shell flour, etc.; finely divided asbestos, mica, graphite, etc. As will be apparent to those skilled in the art, the proportion of filler may be varied within wide limits, for example, for 0 to 100 per cent or more of the weight of the resinous condensation product.

In practicing my claimed invention as it applies particularly to adhesives, the particular isocyanate or isothiocyanate is intimately mixed with the resinous condensation product either in the presence of or absence of a solvent for the components until a homogeneous product is obtained. Since the resinous condensation products vary from viscous liquids to solids, it has been found desirable to dissolve the resinous condensation product in a solvent, for example, an aromatic solvent such as toluene, xylene, benzene, etc.; acetone, chlorinated hydrocarbons, ethyl acetate, etc.; prior to incorporation of the particular cyanato compound. For ease in handling and mixing, the cyanato compound is preferably employed in a suitable solvent therefor and the two solutions mixed together in the desired proportions.

After mixing the ingredients together, the mixture is applied to one or more of the surfaces it is desired to bond, the surfaces brought together so that the adhesive is interposed between the components of the assembly, and the total assembly maintained under pressure for a time sufficient to effect curing of the adhesive.

Ordinarily no heat is necessary for effecting cure of the adhesive since it is per se essentially capable of curing at room temperature. Under some circumstances it may be desirable to accelerate the cure of the adhesive by heating the total assembly at a temperature of the order of about 40° to 100° C.

The pressure required for maintaining the members adhered is relatively small and in most cases is smaller than that usually required for other room curing adhesives. Thus the pressure may range from contact pressure to 400 p. s. i. without any undesirable decrease in the bonding strength. The time required for maintaining the surfaces in intimate contact may obviously be varied within wide ranges and generally may be stated to be of the order of from about 8 to 24 hours.

In order that those skilled in the art may better understand how the present invention may be practiced, the following examples are given by way of illustration and not by way of limitation. All parts are by weight.

*Example 1*

In this example an adhesive composition was prepared by mixing together 10 parts of the resinous condensation product of epichlorohydrin and bis-phenol in the form of a 50 per cent solution (the solvent being 75 per cent, by weight, toluene and 25 per cent, by weight, solvatone) and 10 parts methylene bis-(4-phenyl isocyanate) having the formula

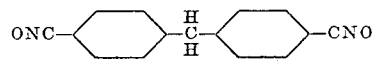

in the form of a 50 per cent solution in orthodichlorobenzene.

The above adhesive was spread on a sanded surface of a 1/16" thick laminated phenolic plastic and on a 1/4" thick aluminum plate. Each surface was air dried about 15 minutes and thereafter placed together and pressed 15 hours at room temperature at about 200 p. s. i. In attempting to strip the laminate from the aluminum surface, the laminate broke within itself.

The above-prepared adhesive was also used to bond molded ethyl cellulose piano action parts to wood shanks. When the bonded material was tested to destruction with a tensile pull, values over 100 lbs. higher than with any previous adhesive were obtained, with breaks occurring in both the wood and the ethyl cellulose.

*Example 2*

Using the adhesive mixture described in Example 1, two aluminum panels 2" x 6" x 1/16" were sanded and thereafter coated with the adhesive mix so that there was a 1/2" overlap along the 6 inch dimension. Enough weight (about 5 p. s. i.) was applied to hold the panels in position and produce a squeeze out bead of resin along the sides. After about 17 hours at room temperature, the weights were removed and the panels allowed to age at room temperature for one week. When samples of this panel were tested for strip shear strength, it was found that the average for five tests was 1920 p. s. i.

*Example 3*

An adhesive was prepared using the same ingredients as employed in Example 1 with the exception that 7 parts of the 50 per cent solution of the resinous condensation product was employed instead of the 10 parts in Example 1, and 2.33 parts of the 50 per cent solution of the methylene bis-(4-phenyl isocyanate) was employed in place of the 10 parts used in Example 1. Aluminum panels prepared and tested as in Example 1 showed an average shear strength of 946 p. s. i. Using an adhesive comprising the same ingredients as in Example 1 (the weight ratio of the resinous condensation product and the diisocyanate being 1:2) aluminum panels were prepared, adhered and tested as in Example 1. The test results showed that the average shear strength was of the order of about 780 p. s. i.

*Example 4*

This example illustrates that by the addition of a cellulosic filler to the mixture of ingredients the curing thereof is promoted, and smaller amounts of the cyanato compound are required to achieve the same degree of cure as when the filler is absent. More particularly, 44 parts of the 50 per cent solution of the resinous condensation product described in Example 1 was thoroughly mixed with 11 parts of a 50 per cent solution of methylene bis-(4-phenyl isocyanate) described in Example 1 and to this mixture was added 18 parts (approximately 40 per cent, by weight, based on the weight of the resinous condensation product solution) of walnut shell flour. When aluminum panels were prepared, adhered and tested as in Example 1, it was found that the average shear strength was of the order of about 805 p. s. i.

It will, of course, be apparent to those skilled in the art that the claimed compositions of matter have other applications than merely as adhesives and may be employed, for example, for molding purposes either by themselves or when mixed with other fillers or resinous, either natural or synthetic, compositions, as impregnating and coating agents in the form of solutions, for casting purposes, etc. In the cured state the claimed compositions are substantially infusible and insoluble in most solvents and are relatively inert to the action of moisture and mildly corrosive materials.

What I claim as new and desire to secure by Letters Patent of the United States is:

1. A room temperature setting adhesive comprising, by weight, (1) from 30 to 80 per cent of the resinous product of reaction between (a) epichlorohydrin and (b) bis-(4-hydroxyphenyl) dimethylmethane, and (2) from 20 to 70 per cent methylene bis-(4-phenyl isocyanate), there being incorporated in the aforesaid adhesive composition a cellulosic filler in an amount ranging, by weight, from 40 to 100 per cent of the weight of the resinous product defined in (1).

2. A room temperature setting adhesive comprising, by weight, (1) from 30 to 80 per cent of the resinous product of reaction between (a) epichlorohydrin and (b) bis-(4-hydroxyphenyl) dimethylmethane, and (2) from 20 to 70 per cent hexamethylene diisocyanate, there being incorporated in the aforesaid adhesive composition a cellulosic filler in an amount ranging, by weight, from 40 to 100 per cent of the weight of the resinous composition defined in (1).

3. A room temperature setting adhesive comprising, by weight, (1) from 30 to 80 per cent of the resinous product of reaction between (a) epichlorophydrin and (b) bis-(4-hydroxyphenyl) dimethylmethane, and (2) from 20 to 70 per cent methylene bis-(4-phenyl isothiocyante), there being incorporated in the aforesaid adhesive composition a cellulosic filler in an amount ranging, by weight, from 40 to 100 per cent of the weight of the resinous product defined in (1).

4. A room temperature setting adhesive comprising, by weight, (1) from 30 to 80 per cent of the resinous product of reaction between (a) epichlorohydrin and (b) bis-(4-hydroxyphenyl) dimethylmethane, and (2) from 20 to 70 per cent of an organic diisocyanate corresponding to the general formula ZCNRNCZ, in which R is a divalent organic radical free of functional groups other than the two —NCZ groups, and Z is a member selected from the class consisting of sulfur and oxygen, there being incorporated in the aforesaid adhesive from 40 to 100 per cent, by weight, of a cellulosic filler based on the weight of the resinous product defined in (1).

5. A room temperature setting adhesive comprising, by weight, (1) from 30 to 80 per cent of the resinous product of reaction between (a) epichlorophydrin and (b) bis-(4-hydroxyphenyl) dimethylmethane, the average molecular weight of the resinous product of reaction being from about 1000 to 3000, and (2) from 20 to 70 per cent of methylene bis-(4-phenyl isocyanate), there being incorporated in the aforesaid adhesive a cellulosic filler in an amount ranging, by weight, from 40 to 100 per cent of the weight of the resinous product defined in (1).

JOHN D. NELSON.

REFERENCES CITED

The following references are of record in the file of this patent:

UNITED STATES PATENTS

| Number | Name | Date |
|---|---|---|
| 2,060,715 | Arvin | Nov. 10, 1936 |
| 2,292,406 | Rothrock | Aug. 11, 1942 |
| 2,444,333 | Castan | June 29, 1948 |
| 2,500,600 | Bradley | Mar. 14, 1950 |
| 2,510,885 | Greenlee | June 6, 1950 |
| 2,558,949 | Greenlee | July 3, 1951 |